United States Patent Office 3,546,189
Patented Dec. 8, 1970

3,546,189
METHOD FOR MAKING ETHYL POLYMERISATES OR ETHYL COPOLYMERISATES IN TUBE REACTORS
Manfred Rätzsch, Leuna, Reinhard Nitzsche, Merseburg, and Claus-Dieter Ebster, Leuna, Germany, assignors to VEB Leuna-Werke "Walter Ulbricht," Leuna, Germany
No Drawing. Filed Jan. 20, 1967, Ser. No. 610,463
Int. Cl. C08f 1/06
U.S. Cl. 260—88.1                              6 Claims

ABSTRACT OF THE DISCLOSURE

In the polymerization of ethylene or ethylene with comonomers in a tube reactor at pressures above 400 atmospheres and temperatures of 50 to 400° C., yields are increased by feeding into the reactor sidestreams of additional monomer and initiator, the latter being fed downstream along the reactor from the former at a point at which the temperature in the reactor is 20 to 200° C. higher than the temperature in the reactor immediately after the introduction of the sidestream of monomer.

---

The present invention relates to a process for the polymerization of ethylene or of ethylene with other polymerizable monomers in tube reactors at pressures above 500 atm. and temperatures ranging from 50–400° C. with addition of initiators forming radicals at the mentioned temperatures.

It has already been proposed to subject ethylene with or without co-reactants to polymerization at the temperatures and pressures mentioned and thereby to produce thermoplastic polymers or copolymers. The polymerization may be carried out continuously in autoclaves with stirrers or in tube reactors with heat of reaction generated amounting to 800 kcal./kg. The reaction heat is partly absorbed in the reaction mixture and partly dissipated to the exterior by cooling of the reactor. Part of the reaction heat may also be absorbed by heat absorbing media added to the reaction mixture.

As radical-forming initiators, there may be added, oxygen, peroxides, azocompounds and other radical-forming substances.

It is known, for instance, to inject the initiator into the reactor when carrying out the polymerization in a tube reactor, at the inlet end and at several points along the reactor, if desired together with a heat-absorbing liquid. The injection at points along the reactor is always effected when the reaction, which was triggered by the previously added initiator, slows down; new initiator injection then causes renewed speed-up of the reaction. By operating in the described manner, higher yields are obtained and the temperature curve in the reactor—the so-called temperature profile—can be better controlled.

However, the known processes have certain shortcomings. When the polymerization is carried out by adding new initiator at different points along the reactor, there are limits to the yields obtained when no inert heat-absorbing media are added at the same time; this is due to the fact that the dissipation of reaction heat to the exterior is markedly inhibited by polymer film deposited on the reactor walls. On the other hand, it means an added expenditure to introduce inert, heat-absorbing media, without making optimum yields feasible per capacity/time unit.

According to another proposal, ethylene mixed with initiator was introduced at the start and at least at one other point of the tube reactor, into the reaction mixture. The ratio of the amount of mixture introduced at a point along the reactor to the one introduced at the start is 3:1 to 1:2. Higher yields are thus obtained.

Finally, it has been proposed to inject cold, oxygen-containing ethylene at different points along the reactor in order to provide an oxygen concentration in the combined gas current of at least 5 p.p.m., preferably 10–100 p.p.m., at a flow rate in the reactor of at least 2.5 cubic meters per second.

The above processes for the polymerization with introduction of ethylene-initiator mixture at several points in the reactor have the drawback that there will be local cooling where the mixture is added and for that reason it will, again, be impossible to obtain optimum yields calculated on capacity per time unit. Moreover, no material free of so-called "fish-eyes" can be obtained without subsequent homogenization, such as is necessary for fine foil production, because the polymers contain too large an amount of high-molecular components.

It is the object of the present invention to overcome the above-mentioned shortcomings of the known processes and to provide a method of polymerization of ethylene or co-polymerization thereof with other polymerizable compounds that will produce satisfactory products for a large number of purposes, including making of fine foils, and in yields which are satisfactory for technical purposes.

Other objects and advantages of the present invention will become apparent from the following detailed description.

The above named objects can be achieved in the polymerization of ethylene or of ethylene with other polymerizable reactants, in tube reactors at pressures above 500 atm. and temperatures ranging from 50–400° C. with addition of initiators forming radicals at the mentioned temperatures, and, if desired with other co-reactants, whereby the reactants are introduced not only at the start but also at several points along the reactor, when, according to the invention, the following mode of operation is observed. The addition of the initiator and that of ethylene, or ethylene with other polymerizable compounds, is effected at different points of the reactor in such a manner, that the initiator is always introduced before the ethylene at temperatures which are in each instance 20–200° C., preferably 50–100° C., above the temperature obtaining in the reactor immediately after the renewed ethylene addition.

The proper temperature of the reaction mixture in the reactor tube at which the initiator should be introduced can be easily adjusted since the operator can calculate the temperature in the reactor tube, which will be obtained after addition of fresh ethylene, from the temperatures and quantites of the gas currents before their admixture.

It is advisable to add new initiator, when the reaction triggered by the previous addition of initiator has tapered off and the temperature in the reactor has reached a maximum, so that upon subsequent addition of ethylene there will be sufficient chain-forming and chain-transferring radicals present.

It is advantageous to introduce the initiator, when added into the reactor at some point along the tube, in a direction opposed to the direction in which the reaction mixture is flowing, and over a zone for mixing which has a cross-section 1/10 to 4/5 of the cross-section of the reactor tube, preferably 1/5 to 1/2. Thereby, the turbulence of the flow is increased, a rapid intermingling of the injected initiator with the reaction mixture is reached and inadmissible local temperature increase leading to decompositions in the reactor, is avoided. The dwell time in the mixing zone is so chosen that at the time of ethylene addition a sufficient quantity of the initiator has become decomposed and adequate amounts of chain-forming and chain transfer radicals have been formed. A mixing zone as the one mentioned can be provided for instance by inserting into the reactor tube a narrower tube having a reduced cross section as indicated, such insertion being effected e.g. by means of a flange connection. Since arrangements of this kind are known, per se, a more detailed description is believed unnecessary.

It is possible, when working in this manner, to inject a single initiator, several different initiators, or mixtures of initiators at the several points of injection.

The following compounds are listed by way of example as radical-forming initiators: oxygen, hydrogen peroxide, di-tert.-butylperoxide, di-lauroylperoxide, di-benzoylperoxide, tert.-butylperbenzoate, di-tert.-butylperoxyoxalate, di-stearylperoxide, di-acetylperoxide, acetyl-benzoylperoxide, $\alpha,\alpha'$-azodiisobutyronitrile and 2,2'-dicyanoazobenzene.

It is advantageous to add co-polymerizable compounds together with the initiator, and/or other co-reactants such as chain growth-control agents or transfer agents, respectively, for instance, cyclohexane, branched paraffins, chlorinated hydrocarbons, alcohols, aldehydes, chlorinated carboxylic acids, ethane, propane and hydrogen, and/or solvents, e.g. benzene, isooctane and others.

Interruption of the polymerization reaction can be brought about in a known manner by reducing the pressure to a level below the polymerization limit of ethylene or the other polymerizable compounds, for instance, by means of a control valve at the outlet end of the reactor.

The advantage of the process according to the invention as compared to known processes consists mainly in the fact that due to the separate initiator and ethylene introductions, the reaction will be triggered faster in the mixing zone of the initiator and, when ethylene is added at the end of said zone, the reaction continues immediately. Thus, with a smaller reactor the same yields can be obtained as with a larger reactor in the known processes. Furthermore, with the rapid onset of polymerization occurring at each point of injection, the formation of undesirably high molecular polymers will be suppressed to a large extent. Moreover, by properly choosing the initiator and dimensioning the mixing zone, the quality of the polymer can be varied as desired.

In the following the invention will be more fully described in a number of examples, but it should be understood that these are given by way of illustration and not of limitation.

EXAMPLE 1

900 kg. ethylene of a temperature of 60° C. and a pressure of 1500 atm. were continuously introduced hourly together with a solution of 0.15 kg. tert.-butylperbenzoate in 3.5 kg. paraffin oil at the inlet end of a tube reactor of 300 m. length and 20 mm. diameter; the reactor was provided with a jacket for temperature control. The pressure in the reactor was regulated by a control valve at the outlet end. Through the jacket, 60 m.$^3$ water were circulated hourly which had a temperature of 210° C. After having traveled 170 m. through the reactor, the reaction mixture had a maximum temperature of 250° C. After the reaction mixture was at 180 m., a solution containing 0.10 kg. di-tert. butyl peroxide in 2.5 kg. paraffin oil was added hourly by means of a second measuring pump and an injection nozzle, the addition being effected in a direction opposite to that of the polymerization mixture in the reactor into an initiator mixing zone of 5 m. length and 12 mm. diameter 2 m. after the tube constriction. At the end of the mixing zone, another 700 kg. ethylene of a temperature of 60° C. were added hourly. Immediately after addition of the ethylene, the temperature dropped in the reaction mixture to 170° C., but it rose rapidly directly thereafter. At a reactor length of 220 m., a maximum temperature of 265° C. had been reached; the reaction was completed and the temperature dropped to 250° C. at the reactor end due to dissipation of heat to the outside. After the reaction mixture was made to expand in a separator, the yield in polyethylene was 205 kg. per hour under the conditions described above, corresponding to 12.75% of ethylene gas used. Measured by ASTM method (test No. 1238–52T), the melting index was 2 g./10 min., tensile strength .135 kg./cm.$^2$ and density 0.922 g./cm.$^3$.

In a comparison test, the reaction was carried out in a 300 m. tube reactor having a diameter of 20 mm. in accordance with Example 1, except for the new introduction of initiator and ethylene. In the comparison test, however, at the end of the mixing zone described in Example 1, to the reaction mixture having a temperature of 250° C., we added 700 kg. ethylene of 60° C., together with a solution of 0.10 kg. di-tert. butylperoxide in 2.5 kg. paraffin oil per hour. Immediately after introduction of ethylene plus initiator, the temperature in the reaction mixture dropped to 165° C. and rose slowly, reaching a new maximum of 255° C. only at a reactor length of 270 m., whereupon a new temperature drop took place. The hourly yield was 198 kg. polymer (12.3% of the ethylene used) having a melt index of 1.7 g./10 min., tensile strength 108 kg./cm.$^2$, and a density of 0.919 g./cm.$^3$.

The test carried out in accordance with the invention and the comparison test show, that in the last mentioned case the second temperature maximum only occurred at 270 meters, that is 50 m. later than that registered in Example 1. This means that the reactor used when carrying out the process according to the invention may be considerably shorter. Also, the polymer so obtained had a higher tensile strength and a higher density than the one obtained in the comparison test. Finally, the product was of high homogeneity and thus better adapted for making fine foils.

EXAMPLE 2

Into the reactor described in Example 1, we introduced at the start hourly 900 kg. ethylene and 50 kg. propane having a temperature of 60° C. and a pressure of 1500 atm., as well as a solution of 0.18 kg. dilauroyl peroxide in 9 kg. paraffin oil. Introduction was continuous. Through the jacket 60 m.$^3$ water of 190° C. were circulated per hour. At a reactor length of 170 m., a temperature maximum of 220° C. was found and the polymerization was complete. At 180 m. of the reactor length, a solution of 0.10 kg. di-tert. butylperoxide in 2.5 kg. paraffin oil was introduced hourly, in the manner described in Example 1, into an initiator mixing zone of 12 mm. diameter and 5 m. length. At the end of the mixing zone, 700 kg. ethylene were added hourly together with 40 kg. propane having a temperature of 60° C. Immediately thereafter, the temperature of the reaction mixture droped to 150° C. and rose rapidly again. At a reactor length of 220 m., a maximum temperature of 240° C. had again been reached which dropped down to 215° C. at the reactor end.

There were recovered hourly 230 kg. of a solid polymer (13.5% of the ethylene used). Density of the product: 0.923 g./cm.$^3$, melting index 2.2 g./10 min., and tensile strength 145 kg./cm.$^2$. The product was suitable for making fine foils which exhibit good transparency.

EXAMPLE 3

Into the reactor described in Example 1, 900 kg. ethylene of 60° C. were continuously introduced per hour at a pressure of 1500 atm. together with a solution of 0.14 kg. dilauroyl peroxide and 0.03 kg. tert. butyl perbenzoate in 10 kg. methanol. Through the jacket, 60 m.$^3$ water of 190° C. were circulated hourly. At a reactor length of 170 m., a temperature maximum of 260° C. was observed. At 180 m. reactor length, a solution of 0.10 kg. tert. butylperbenzoate in 5 kg. methanol was introduced hourly into the initiator mixing zone in the manner described in Example 1. At the end of the mixing zone, another 700 kg. ethylene having a temperature of 60° C. were hourly added. Immediately after the addition of ethylene, the temperature of the reaction mixture dropped to 160° C., but rose rapidly again shortly after. The second temperature maximum of 270° C. was reached at a reactor length of 220 m.

After the reaction mixture had undergone pressure release, the polymer was subjected to vacuum distillation for the removal of methanol. Obtained were 310 kg. of a solid polymer per hour (17.1% of the ethylene used). Density of the product: 0.927 g./cm.$^3$, melting index 3.8 g./10 min., tensile strength 132 kg./cm.$^2$.

The polymer was homogeneous and well suited for fine foils of high transparency.

What we claim is:

1. Process for preparing ethylene polymers by introducing a monomer material selected from the group consisting of ethylene and mixtures of ethylene and a monomer copolymerizable therewith and a free radical forming initiator into a tubular polymerization zone at a pressure of about 500 atmospheres and a temperature of from 50 to 400° C. comprising introducing said monomer material and said initiator into the inlet of said polymerization zone, introducing an additional quantity of said monomer material at a point intermediate said inlet and the outlet of said polymerization zone, said additional monomer material having a temperature lower than the temperature of the polymerization mixture in said polymerization zone at the point of introduction thereof whereby the temperature of the polymerization mixture is lowered, introducing additional free radical forming initiator into said polymerization zone at a point intermediate said inlet and outlet but upstream of said point where said monomer material is introduced, the point of introduction of said additional initiator having a temperature which is 20 to 200° C. higher than the temperature to which the polymerization mixture is lowered by introduction of said additional monomer material.

2. Process according to claim 1 which comprises introducing said additional monomer material so that the temperature at the point of introduction of said additional initiator amounts to from 50 to 100° higher than the temperature to which the polymerization mixture is lowered by introduction of said additional monomer material.

3. Process according to claim 1 wherein the cross-section of said polymerization zone at the point of introduction of said initiator is from $1/10$ to $4/5$ of the rest of said polymerization zone.

4. Process according to claim 3 wherein the cross-section of said polymerization zone at the point of introduction of said initiator is from $1/5$ to $1/2$ that of the rest of said polymerziation zone.

5. Process according to claim 1 which comprises introducing said free radical forming initiator in admixture with a solvent.

6. Process according to claim 1 which comprises introducing said free radical forming initiator in admixture with at least one member of the group consisting of control agents for chain growth and chain transfer.

References Cited

UNITED STATES PATENTS

| | | | |
|---|---|---|---|
| 2,436,256 | 2/1948 | Hanford et al. | 260—94 |
| 3,334,081 | 8/1967 | Madgwick et al. | 260—94.9 |
| 3,373,148 | 3/1968 | Mackie et al. | 260—87.3 |

FOREIGN PATENTS

| | | |
|---|---|---|
| 471,310 | 2/1961 | Canada. |

JOSEPH L. SCHOFER, Primary Examiner

J. C. HAIGHT, Assistant Examiner

U.S. Cl. X.R.

260—94.9, 88.2